US009992156B2

United States Patent
Tan et al.

(10) Patent No.: US 9,992,156 B2
(45) Date of Patent: Jun. 5, 2018

(54) DNS SECURITY SYSTEM AND FAILURE PROCESSING METHOD

(71) Applicant: BEIJING QIHOO TECHNOLOGY COMPANY LIMITED, Beijing (CN)

(72) Inventors: Xiaosheng Tan, Beijing (CN); Xiangdong Qi, Beijing (CN); Can Pu, Beijing (CN)

(73) Assignee: Beijing Qihoo Technology Company Limited, Beijing (CN)

(*) Notice: Subject to any disclaimer, the term of this patent is extended or adjusted under 35 U.S.C. 154(b) by 45 days.

(21) Appl. No.: 15/305,091

(22) PCT Filed: Mar. 19, 2015

(86) PCT No.: PCT/CN2015/074614
§ 371 (c)(1),
(2) Date: Oct. 18, 2016

(87) PCT Pub. No.: WO2015/158194
PCT Pub. Date: Oct. 22, 2015

(65) Prior Publication Data
US 2017/0048187 A1    Feb. 16, 2017

(30) Foreign Application Priority Data
Apr. 18, 2014  (CN) .......................... 2014 1 0158695

(51) Int. Cl.
*H04L 29/06*  (2006.01)
*H04L 29/12*  (2006.01)
(Continued)

(52) U.S. Cl.
CPC ...... *H04L 61/1511* (2013.01); *H04L 41/0654* (2013.01); *H04L 41/0677* (2013.01); *H04L 63/00* (2013.01)

(58) Field of Classification Search
None
See application file for complete search history.

(56) References Cited

U.S. PATENT DOCUMENTS 7,680,876 B1*  3/2010  Cioli .................. G06F 11/1662
                                                     709/201
2003/0182447 A1*  9/2003  Schilling ........... H04L 29/12066
                                                     709/245
2006/0259723 A1*  11/2006  Petruzzo ............. G06F 11/2082
                                                     711/162

(Continued)

FOREIGN PATENT DOCUMENTS

CN         101431539 A       5/2009
CN         103354525 A       10/2013
(Continued)

OTHER PUBLICATIONS

International Patent Application No. PCT/CN2015/074614; Int'l Written Opinion and Search Report; dated Jun. 19, 2015; 10 pages.

*Primary Examiner* — Eric Chen
(74) *Attorney, Agent, or Firm* — Baker & Hostetler LLP

(57) ABSTRACT

The present invention provides a DNS security system and failure processing method. The DNS security system comprises: at least one client, configured to initiate a DNS request; a root node, configured to provide authorization information to the DNS request; an authorization information database, configured to store all DNS requests and corresponding authorization information in a designated area; a virtual root node, configured to invoke corresponding authorization information from the authorization information database when a DNS resolution failure occurs on the root node, and to provide a resolution service to a corresponding client. Using the present invention enhances the security and stability of DNS resolution.

18 Claims, 5 Drawing Sheets

(51) Int. Cl.
*H04L 12/24* (2006.01)
*G06F 7/04* (2006.01)
*G06F 17/30* (2006.01)

(56) References Cited

U.S. PATENT DOCUMENTS

| | | | |
|---|---|---|---|
| 2008/0235383 A1* | 9/2008 | Schneider | G06F 17/30887 709/229 |
| 2009/0232009 A1* | 9/2009 | Finkelstein | H04L 12/66 370/248 |
| 2010/0031078 A1* | 2/2010 | Foote | H04L 29/12066 714/4.1 |
| 2010/0306409 A1* | 12/2010 | Jansen | H04L 29/12066 709/245 |
| 2013/0111049 A1* | 5/2013 | Abu-Amara | H04L 61/1511 709/230 |
| 2014/0006577 A1* | 1/2014 | Joe | H04L 61/1511 709/223 |
| 2014/0282887 A1* | 9/2014 | Kaminsky | H04L 61/1511 726/4 |
| 2015/0074221 A1* | 3/2015 | Kuparinen | H04L 29/12066 709/214 |
| 2015/0288556 A1* | 10/2015 | Diederich | H04L 67/42 709/223 |

FOREIGN PATENT DOCUMENTS

| | | |
|---|---|---|
| CN | 103957284 A | 7/2014 |
| CN | 103957285 A | 7/2014 |
| CN | 103957286 A | 7/2014 |

* cited by examiner

DNS SECURITY SYSTEM AND FAILURE PROCESSING METHOD

CROSS-REFERENCE TO RELATED APPLICATIONS

This application is the national stage of International Application No. PCT/CN2015/074614 filed Mar. 19, 2015, which claims the benefit of Chinese Patent Application No. CN201410158695.6, filed Apr. 18, 2014, the entire contents of which are incorporated herein by reference.

FIELD OF TECHNOLOGY

The present invention generally relates to the application field of Internet and, more particularly, to a DNS security system, and a method for processing failure using the DNS security system.

BACKGROUND

A DNS, an abbreviation of Domain Name System, is a core service of Internet. As a distributed database that can mutually map a domain name with IP address, the DNS can make it more convenient for a user to access to Internet without bearing in mind IP strings that can be read directly by a machine.

Usually, an Internet host domain name has a general structure as follows: host name. third-level domain name. second-level domain name. top-level domain name. The top-level domain name of Internet is registered and searched by an Internet network association, and is enrolled and managed by a committee responsible for network address allocation. A unique IP address is allocated for each host on the Internet.

FIG. 1 is a hierarchical architecture diagram of DNS in the prior art. The existing DNS architecture is a hierarchical tree structure which is referred to as a DNS domain name space. An uppermost domain name space is referred to as "root node". A path from a top-level domain to a sub-domain forms a domain name. For example, a path from a top-level domain.com to its second-level domain Microsoft and then to a sub-domain departmentA of Microsoft forms a domain name of departmentA.microsoft.com.

Wherein, the DNS root server is the "root" of the DNS tree-based domain name space, which is responsible for the resolution of DNS, and plays an extremely crucial role in the domain name resolution. Theoretically, for any form of standard domain name to implement to be resolved, according to the technical process, it must go through the work of the global "hierarchy-type" of domain name resolution system to accomplish.

The first level of the "hierarchy-type" of domain name resolution system is the root server, which is responsible for the management of the domain name information of all countries in the world; and below the root server there is the top-level domain name server, namely, the database of the domain name administration agencies of the relevant country, such as Chinese CNNIC; and then the cache server of the next level of the domain name database and ISP (Internet Service Provider) is turned to for query. A domain name must first pass through the resolution of the root database, then it may be switched to the top-level domain name server for resolution. If the DNS root node cannot be accessed, then all of the domain name resolutions will fail.

SUMMARY

In light of above problems, there is provided a DNS security system and a corresponding method for processing fault, which may overcome or at least partially solve or mitigate above problems.

According to an aspect of the present invention, there is provided a DNS security system, which comprises:

at least one client, configured to initiate a DNS request;

a root node, configured to provide authorization information for the DNS request;

an authorization information database, configured to store all DNS requests and corresponding authorization information in a designated area;

a virtual root node, configured to invoke corresponding authorization information from the authorization information database when a DNS resolution failure occurs on the root node, and to provide a resolution service to the corresponding client.

According to another aspect of the present invention, there is also provided a failure processing method, which utilizes any one of the above mentioned items of DNS security system, which comprises:

obtaining and storing all DNS requests and corresponding authorization information in a designated area, and generating an authorization information database;

determining whether a DNS resolution failure occurs on the root node or not;

if a DNS resolution failure occurs on the root node, initiating the virtual root node, and using the virtual root node to invoke corresponding authorization information stored in the authorization information database to provide a DNS resolution service to a corresponding client.

According to another aspect of the present invention, there is also provided a computer program, which includes a computer readable code, and when the computer readable code runs on a computer device, it causes the computer device to perform any one of the above mentioned failure processing method, which utilizes the DNS security system.

According to another aspect of the present invention, there is provided a computer readable medium, which stores therein the above mentioned computer program.

The invention has the beneficial effects of: in the embodiment of the present invention, a virtual root node is set, and when a DNS resolution failure occurs on a root node, the virtual root node may replace the root node to realize DNS resolution function. In order to realize this function of virtual root node, in an authorization information database, enough information must be stored, that is, in an authorization information database, all DNS requests and corresponding authorization information in a designated area are stored, so that a virtual root node may have enough resources to response to DNS requests. Therefore, the realization of a virtual root node is based on the authorization information database. Combined with a new added authorization information database and virtual root node, it may provide a DNS resolution function for a client when a resolution failure occurs on a root node, and it may reduce the DNS single point failure and improve DNS capability of defensing attacks, at the same time, it may also set an access authority control for a virtual root node, shield DNS attack data, and improve the safety and stability of the DNS resolution. For a dangerous DNS attack, the specific authorization information may not be queried from the authorization information database, and then the virtual root node may not provide a resolution service, therefore the prevention of DNS attacks will be realized.

The above description is merely an overview of technical solutions of the present invention. In order to more clearly understand the technical solutions of the present invention to implement in accordance with the contents of the description, and to make the foregoing and other objects, features and advantages of the invention more apparent, detailed embodiments of the invention will be provided below.

BRIEF DESCRIPTION OF THE DRAWINGS

Through reading the detailed description of the following preferred embodiments, various other advantages and benefits will become apparent to those of ordinary skills in the art. Accompanying drawings are merely included for the purpose of illustrating the preferred embodiments and should not be considered as limiting of the invention. Further, throughout the drawings, like elements are indicated by like reference numbers.

DESCRIPTION OF THE EMBODIMENTS

Exemplary embodiments of the present invention will be described in detail with reference to the accompanying drawings hereinafter.

Figure 1:
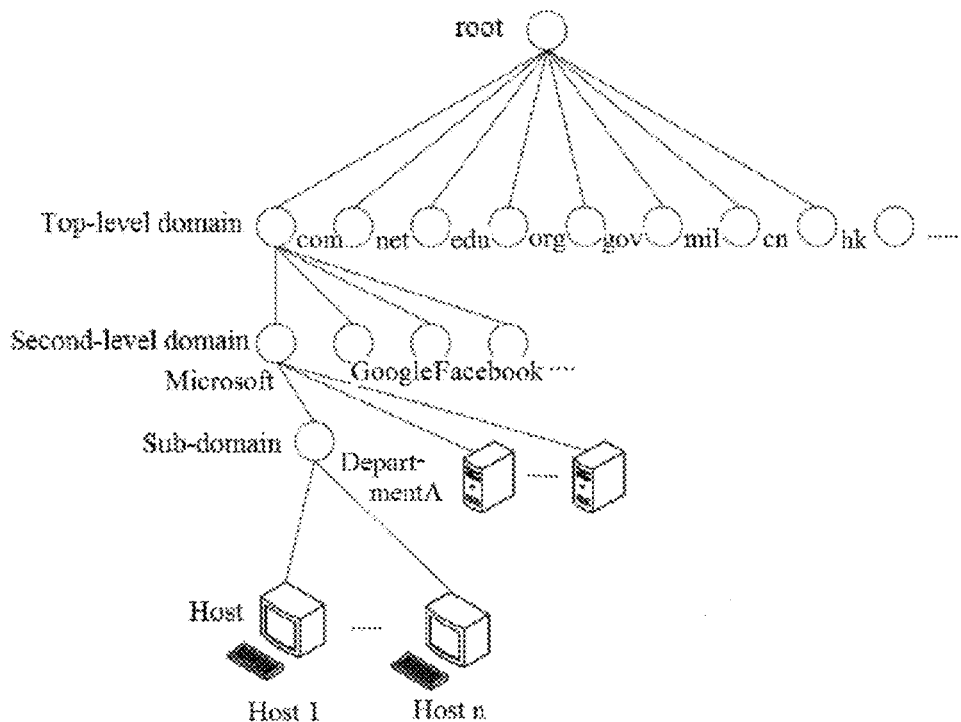
FIG. 1 is a schematic diagram showing the overall DNS architecture according to the prior art.
Figure 2:
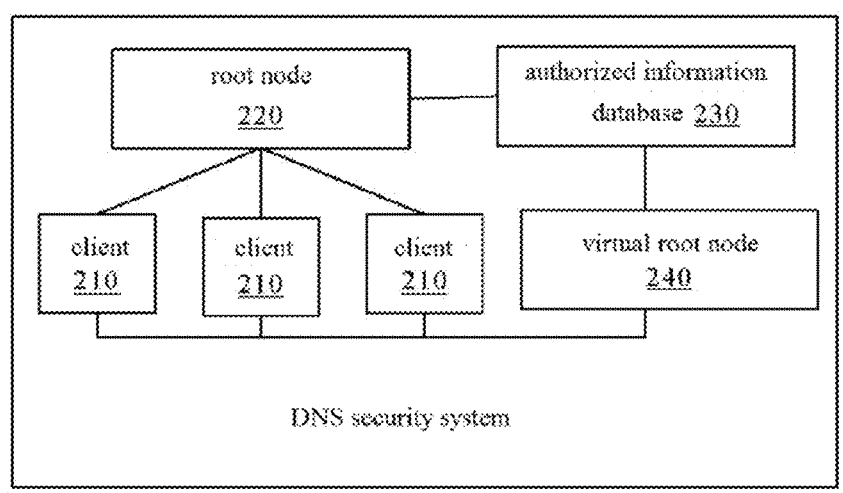
FIG. 2 is a schematic diagram showing the structure of a DNS security system according to an embodiment of the present invention.

In order to solve above technical problems, the embodiment of the invention provides a DNS security system, which is used to perform disaster recovery processing of fault processing class when a structural failure of a root node occurs. FIG. 2 is a schematic diagram showing the structure of a DNS security system according to an embodiment of the present invention. As shown in FIG. 2, a DNS security system at least comprises:

at least one client 210, configured to initiate a DNS request;

a root node 220, configured to provide authorization information for the DNS request initiated by any one of client 210;

an authorization information database 230, configured to store all DNS requests and corresponding authorization information in a designated area;

a virtual root node 240, configured to invoke corresponding authorization information from the authorization information database 230 when a DNS resolution failure occurs on the root node 220, and to provide a resolution service to the corresponding client 210.

In the embodiment of the invention, a virtual root node is set, and when a DNS resolution failure occurs on a root node, the virtual root node may replace the root node to realize DNS resolution function. In order to realize this function of virtual root node, in an authorization information database, enough information must be stored, that is, in an authorization information database, all DNS requests and corresponding authorization information in a designated area are stored, so that a virtual root node may have enough resources to response to DNS requests. Therefore, the realization of a virtual root node is based on the authorization information database. Combined with a new added authorization information database and virtual root node, it may provide a DNS resolution function for a client when a resolution failure occurs on a root node, and it may reduce the DNS single point failure and improve DNS capability of defensing attacks, at the same time, it may also set an access authority control for a virtual root node, shield DNS attack data, and improve the safety and stability of the DNS resolution. For a dangerous DNS attack, the specific authorization information may not be queried from the authorization information database, and then the virtual root node may not provide a resolution service, so it may be implemented to prevent DNS attacks.

Specifically, processing to the DNS attack behavior is described in detail. In the embodiment of the present invention, for each received network data packet, the type of DNS behavior corresponding to the network data packet should be determined, and according to the determined DNS behavior type, the main body of processing which processes the network data packet may be determined, and then the network data packet is transferred to a definite main body of processing for processing. In the embodiment of the present invention, the main body of processing may be composed of two layers, which are the kernel layer and the application layer respectively. The kernel layer which includes the network layer and the driver layer etc, which may realize functions of high-speed caching, attack defense, etc., while the application layer may perform basic resolution on the network data packet, including the acquisition of the address after the domain name resolution, the data storage address, etc. Compared with the method of DNS behavior processing in the existing techniques, that the network data packets are divided into the kernel layer and the application layer respectively for processing, may process the DNS request according to the actual request, and if encounter millions of DNS request attacks per second, they may also be processed by the kernel layer with better processing ability, while encounter DNS requests with relatively low requirement for timeliness, then they may be processed by the application layer. Using the kernel layer and the application layer to process DNS requests respectively, with the enormous processing power of the kernel to be taken into account, large flow of the DNS query may be realized. In addition, when the modification or startup caused by the DNS request lead to loading, because the kernel and application layer are to process separately, one of them may be used to process the present DNS request, and the other to continue to provide services to the outside. Therefore, in the embodiment of the present invention, the business processing capability of the single machine is improved, and while greatly improving the processing capability and security defense ability of the system, it may also realize the rapid domain name dynamic management and configuration, and then implement a lot of customized complex functional requirements.

When the DNS behavior type is determined as aggressive behavior, so the main body of processing may be determined to be the kernel, and while the DNS behavior type is the domain name resolution behavior, the main body of processing may be determined to be the application layer. In order to improve the response speed, processing property and security defense capability of the domain name resolution service, according to the resolution principle of DNS, in the kernel module, the functions of caching and security defense may be realized, and under normal circumstances, the kernel module may process 98% of the resolution request and most of the attack defense effectively and stably. While basic resolution and management functions, the processing logic of which is relatively complex, and the requirement of performance is not that high, are realized in the application layer.

Therefore, when the main body of processing is the kernel, the kernel detects the network data packet, filters the DNS attack behavior carried in the network packet, and transfers the filtered network data packet to the application layer for processing. When the kernel detects the network data packet, strategies, such as the anti-DDOS attack strategy, IP speed-limit strategy, domain name speed-limit strategy, may be started, and an independent internal module may be set for each strategy in the kernel to realize different strategies correspondingly.

It should be explained here that each network data packet has a character code, and each character code is unique, therefore, the property of the DNS request of a property may be determined according to the character code, and see through a DNS attack operation which disguises as a normal data packet. Now it is based on the following steps to determine whether in the network packet, a DNS attack behavior is carried or not:

step A, calculate the character code of the network data packet;

step B, determine whether the character code is the characteristic code of the DNS attack behavior or not, and if it is, execute step C, if not, execute step D;

step C, if it is, then determine that in the network packet, a DNS attack behavior is carried;

step D, if no, then determine that in the network packet, a DNS attack behavior is not carried.

Herein, a collection of the character codes of the known DNS attack behaviors is usually stored in the database, and when need to validate, match the character code calculated in Step A with the collection in the database, if the character code calculated in Step A exists in the collection, then it is DNS attack behavior, otherwise it is not.

Herein, the character code may be determined according to domain name information of IP, domain name or others. For example, calculate the number of network data packets received from the same IP within a specified time and obtain the character code, and/or calculate the number of network data packets received from the same domain name within a specified time. If within 1 second, the number of network data packets received from the same IP or the same domain name is greatly larger than the number of packets should be received, then it is proved that the IP address or domain name has been turned into an attack source. This is also the basic principle of the IP speed-limit strategy and the domain name speed-limit strategy. For the IP address or domain name which has been proved to have turned into an attack source, when receives a network data packet from this source again afterwards, it may be directly discarded or filtered, to avoid the attack from it, and improve safety performance and processing efficiency of the system.

After filtering the attack behavior, the kernel sends the network data packet to the application layer for processing. The application layer may resolve the network data packet, obtain the address information corresponding to the domain name, thus obtaining the relevant data and feeding back to the client. In addition, the application layer may manage the domain name information and other data, achieving the data management function.

At present, there are only 13 root servers worldwide, and the current distribution is: main root server (A), 1 in United States, set in the state of Virginia; secondary root servers (B to M), 9 in United States, and 1 in Sweden, Holland, Japan respectively. From the above data, the number of the root server (namely the root node) is less, and mainly set in the part of areas, then in the process of domain name analysis, other areas lack initiative and risk control functions.

The domain name system is the basis service of Internet, while the root server is the base of the whole domain name system, and controlling the root server of the domain name resolution is controlling all the corresponding domain names and IP addresses. If the country which owners a root server suddenly shields the domain name of an area, then the websites to which these domain names route will disappear from the Internet. Therefore, it is very important to set up the virtual root node.

In the embodiment of the present invention, under the circumstance that a DNS resolution failure occurs on the root node 220, the virtual root node 240 is used to perform DNS resolution. In order to improve the resolution speed, some commonly-used DNS resolution records which are under bigger visiting quantity, or the DNS resolution records of some important domain names, may be stored in the designated area in the authorization information database 230 separately, so that when the virtual root node 240 queries in the authorization information database 230, it may reply quickly, achieving an emergency response. That is, in the authorization information database 230, the authorization information may include the DNS resolution records with the stored access amount exceeds the access threshold value, and/or the DNS resolution records of important domain names.

Figure 3:
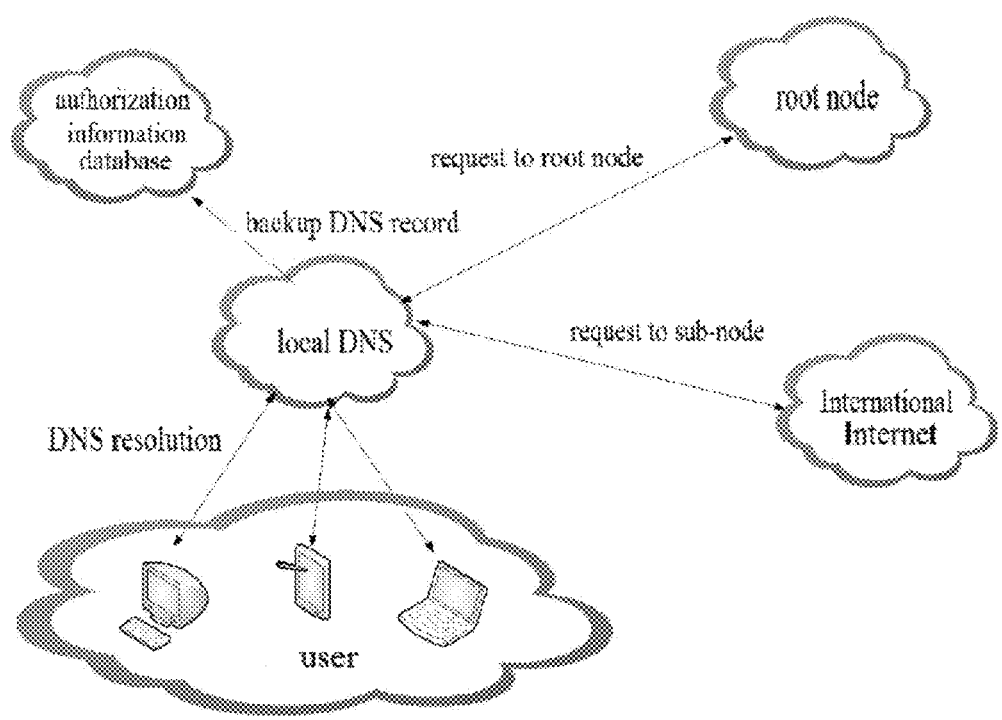
FIG. 3 is a schematic diagram showing an authorization information database performing data backup of the local DNS server according to an embodiment of the present invention.

Herein, it should be noted that the authorization information in the authorization information database 230 matches with the resolution process of the root node 220, and according to the interrelationships among the authorization information, it may form a domain name hierarchy space, corresponding to the first level of the domain name space. In addition, all the data information in the authorization information database 230 may be updated in real time. The real-time update here refers to that every once in a while, it may add the new resolution record in the network into the authorization information database, and it may also move the part of the resolution records not used for a long term rearward and delete. For the Internet, the authorization information database 230 is the Internet domain name level of the mirror image. FIG. 3 is a schematic diagram showing an authorization information database performing data backup of the local DNS server according to an embodiment of the present invention.

Take China as an example, when collecting DNS resolution records, since all the root node and the authorization server for international domain names are in foreign countries, the package capturing may be performed at the outlet of the China backbone network, DNS resolution records are extracted and analyzed, and the corresponding DNS record information is stored, to ensure the safety and reliability of the captured package.

In the embodiment of the present invention, the virtual root node 240 using a distributed deployment, through the way of BGP (Border Gateway Protocol, used to connect routing protocols of stand-alone systems on the Internet), provides DNS resolution service to the client 210. It should be noted that preferably, the BGP way may be an anycast mode.

It has been mentioned before that what the virtual root node 240 controls is a designated area range, and under normal operating conditions, a DNS request in the critical range might also be responded to, but to ensure that the response in the present area is normal, when an abnormal resolution occurs, the virtual root node 240 will give priority to ensuring that the DNS response in the present area is normal. In order to realize this purpose, in the authorization information database 230 or the virtual root node 240, the DNS request records or lists in the present area may be set up, and when a DNS request initiated by the client 210 exists in the records or lists, then response to it preferentially.

In order to ensure that the virtual root node 240 may get informed of a resolution failure occurring on a root node, the virtual root node 240 may monitor the critical area outlet of the designated area for the DNS data messages in the backbone network, so as to determine whether a DNS resolution failure occurs or not. Specifically, taking China for example, the DNS data messages may be monitored at the outlet from China to the overseas, and monitor the correctness of the DNS resolution record, once a root node and other uncontrollable domain name resolution abnormal conditions are detected, at the outlet, a corresponding request packet may be transmitted to the virtual root node 240 to perform responses, preventing the data from going on to a foreign server and thus leading to be tampered with.

The result of the root domain name resolution is generally not easily modified, and if the currently returned resolution result does not match the pre-stored results in the historical records, then it is proved that the resolution is tampered, and needs to alarm or to adopt human interventions. In addition, if the authorization from a top-level domain may not work normally or all the returned are "SERVFAIL", it may also be directly determined as a resolution result error. A processing method for that the DNS resolution result is incorrect is: after the resolution result being tampered, determine according to the alarm information, operate to click on the interface, and the system automatically switches in bulk to the DNS resolution of the virtual root node in batch.

The above alarm information may be combined with the pre-collected illegal DNS IP address list and legal DNS IP address white-listing list addresses to determine, for example, the pre-collected list of malicious DNS IP addresses may be a set of illegal DNS IP addresses collected in advance by security vendors, and the pre-collected list of malicious DNS IP addresses may be a list of malicious DNS IP addresses collected in the client database in advance, or may also be a list of malicious DNS IP addresses downloaded from a website into the client database. The pre-set legal DNS IP address white-listing list may be previously stored in the client database, and may also be downloaded from the website server (e.g., cloud security server).

In the specific implementation, the main security levels include "dangerous", "warning" and "safe", among which, "dangerous" security level represents most threatening to users, "warning" security level takes second place, and "safe" security level is the weakest. The tips on the program interface may also be carried out based on these.

Figure 4:
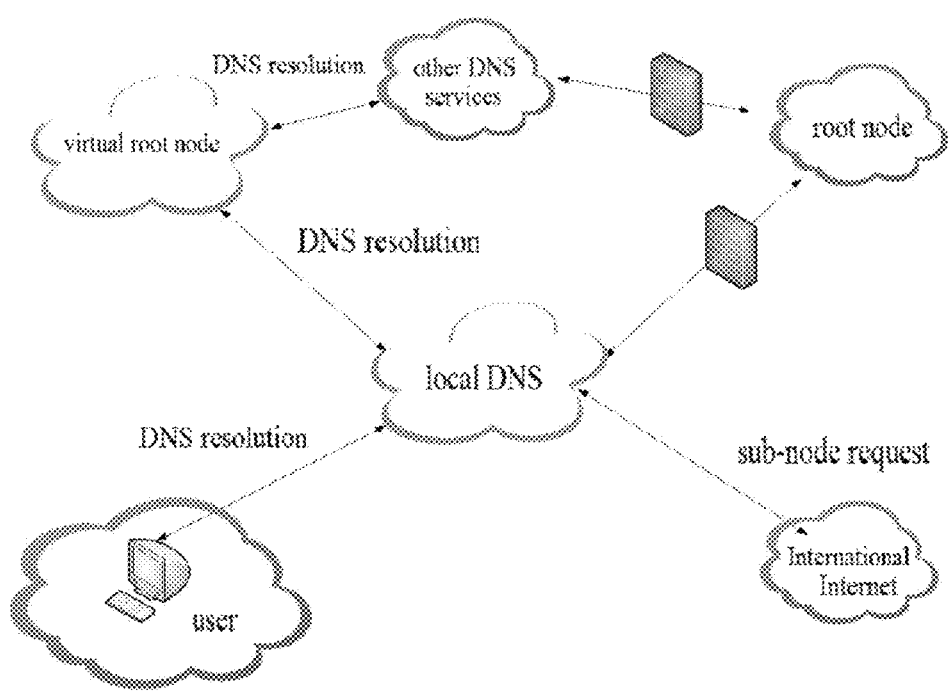
FIG. 4 shows a specific architecture diagram of a DNS security system according to an embodiment of the present invention.

FIG. 4 shows a specific architecture diagram of a DNS security system according to an embodiment of the present invention. See FIG. 4, the virtual root node would establish a data link with the local DNS server and other DNS servers. In order to realize this purpose, each DNS server in FIG. 4 may be regarded as when a DNS resolution failure occurs on the root node, at least a recursive DNS, modifies the locally saved root node addresses to addresses pointing into the virtual root node; or sends the local domain name resolution to the virtual root node. Thus it may make the root node provide domain name resolution services according to the data records stored in the authorization information database.

Further, in the local DNS server, a cache is set up, which stores domain name resolution records over a period of time before. In the process of the domain name resolution, the local DNS server may check whether there is a cache for the domain name in its own space first, if no, it may send a domain name resolution request for this domain name to the root node (the root DNS server). If a failure occurs on the root node, then the local DNS server does not check out a cache for this domain name in its own space, it may send a domain name resolution request for this domain name to the virtual root node.

Figure 5:
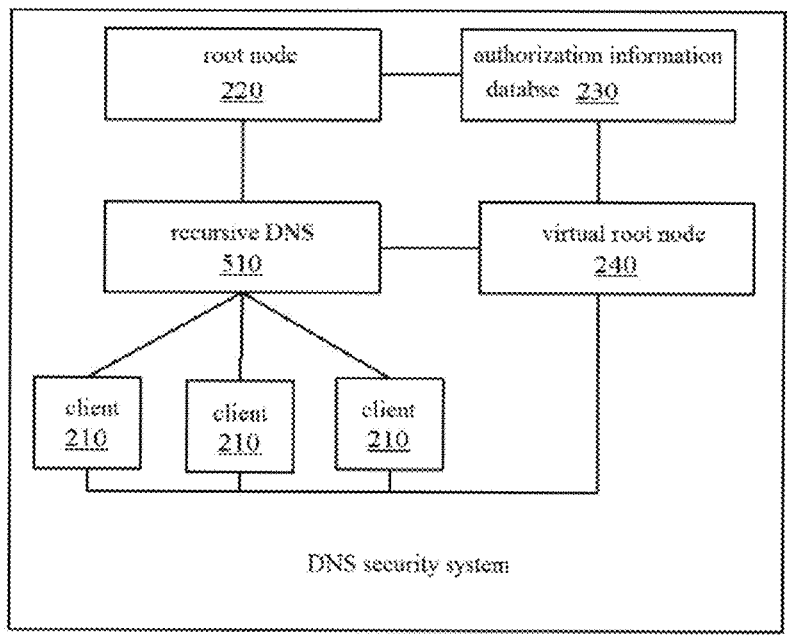
FIG. 5 shows another schematic diagram of the structure of a DNS security system according to an embodiment of the present invention.

FIG. 5 shows another schematic diagram of the structure of a DNS security system according to an embodiment of the present invention, and compared with the DNS security system shown in FIG. 2, FIG. 5 adds at least one recursive DNS 510. In FIG. 5, shows only one recursive DNS, in practical application, there may exist more than one, and each recursive DNS may serve for multiple clients.

In the embodiment of the present invention, it should be noted that if a part of the DNS servers are unable to repair quickly, user experience may be greatly affected; at this point, the client may change the user's DNS urgently onto other DNS servers which may run normally, to ensure that users may use the network normally.

Figure 6:
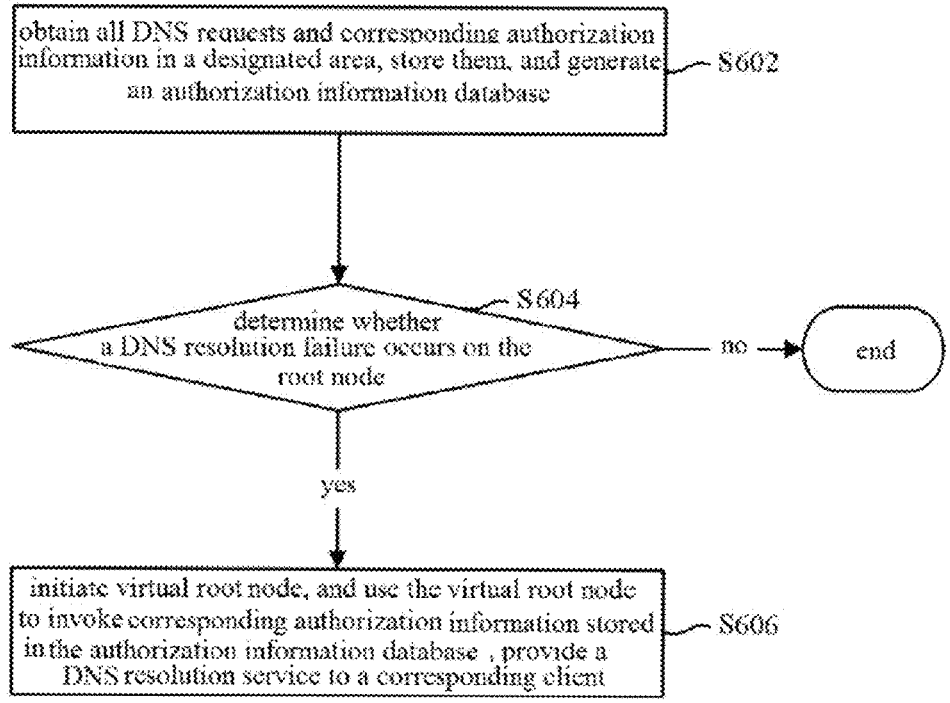
FIG. 6 shows a processing flow chart of a method, which uses a DNS security system to process a failure, according to an embodiment of the present invention.

Based on the same inventive concept, the embodiment of the present invention also provides a method, which applies a DNS security system provided by any one of the above mentioned preferred embodiments or their combinations to process a failure. FIG. 6 shows a processing flow chart of a method, which uses a DNS security system to process a failure, according to an embodiment of the present invention. See FIG. 6, the flow chart includes at least from step 602 to step 606:

step 602, obtain and store all DNS requests and corresponding authorization information in a designated area, and generate an authorization information database;

step 604, determine whether a DNS resolution failure occurs on the root node or not; if yes, then trigger step 606, if no, then the process ends;

step 606, if a DNS resolution failure occurs on the root node, initiate the virtual root node, and use the virtual root node to invoke corresponding authorization information stored in the authorization information database to provide a DNS resolution service to a corresponding client.

In a preferred embodiment, the authorization information includes the DNS resolution records with the stored access amount exceeds the access threshold value, and/or, the DNS resolution records of important domain names.

In a preferred embodiment, the authorization information database forms a domain name hierarchy space according to the interrelationships between the authorization information.

In a preferred embodiment, the authorization information database is the Internet domain name level of the mirror image.

In a preferred embodiment, the virtual root node is used to provide DNS resolution services to the client, includes: the virtual root node using a distributed deployment, through the way of BGP to provide DNS resolution services to the client.

In a preferred embodiment, the BGP way includes an anycast mode.

In a preferred embodiment, determine whether a DNS resolution failure occurs on a root node or not, includes: monitor the critical area outlet of the designated area for the DNS data messages in the backbone network, so as to determine whether a DNS resolution failure occurs or not.

In a preferred embodiment, the above mentioned methods also include:

when a DNS resolution failure occurs on the root node, at least a recursive DNS, modifies the saved root node addresses into addresses pointing to the virtual root node; or sends the local domain name resolution to the virtual root node.

Adopting the DNS security system and failure processing method provided by the embodiments of the present invention, the following beneficial effects may be achieved:

in the embodiments of the present invention, a virtual root node is set up; when a DNS resolution failure occurs on a root node, the virtual root node may replace the root node to realize DNS resolution function. In order to realize this function of virtual root node, in an authorization information database, enough information must be stored, that is, in an authorization information database, all DNS requests and corresponding authorization information in a designated area are stored, so that a virtual root node may have enough resources to response to DNS requests. Therefore, the realization of a virtual root node is based on the authorization information database. Combined with a new added authorization information database and virtual root node, it may provide a DNS resolution function for a client when a resolution failure occurs on a root node, and it may reduce the DNS single point failure and improve DNS capability of defensing attacks, at the same time, it may also set an access authority control for a virtual root node, shield DNS attack data, and improve the safety and stability of the DNS resolution. For a dangerous DNS attack, the specific authorization information may not be queried from the authorization information database, and then the virtual root node may not provide a resolution service, therefore the prevention of DNS attacks will be realized.

Many details are discussed in the specification provided herein. However, it should be understood that the embodiments of the disclosure may be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the disclosure, various features of the present invention may sometimes be grouped together into a single embodiment, accompanying FIG or description thereof. However, the method of this disclosure should not be constructed as follows: the present invention for which the protection is sought specifies more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims may be considered as a separate embodiment of the present invention.

It should be understood by those skilled in the art that modules of the device in the embodiments may be adaptively modified and arranged in one or more devices different from the embodiment. Modules, units or components in the embodiment may be combined into one module, unit or component, and also may be divided into more sub-modules, sub-units or sub-components. Except that at least some of features and/or processes or units are mutually exclusive, various combinations may be used to combine all the features disclosed in specification (including claims, abstract and accompanying drawings) and all the processes or units of any methods or devices as disclosed herein. Unless otherwise definitely stated, each of features disclosed in specification (including claims, abstract and accompanying drawings) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the present invention and forms the different embodiment. For example, in the claims, any one of the embodiments for which the protection is sought may be used in any combination manner.

Each of devices according to the embodiments of the present invention may be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the present invention. The present invention may further be implemented as device program (for example, computer program and computer program product) for executing some or all of the methods as described herein. Such program for implementing the present invention may be stored in the computer readable medium, or have a form of one or more signals. Such a signal may be downloaded from the internet websites, or be provided in carrier, or be provided in other manners.

Figure 7:
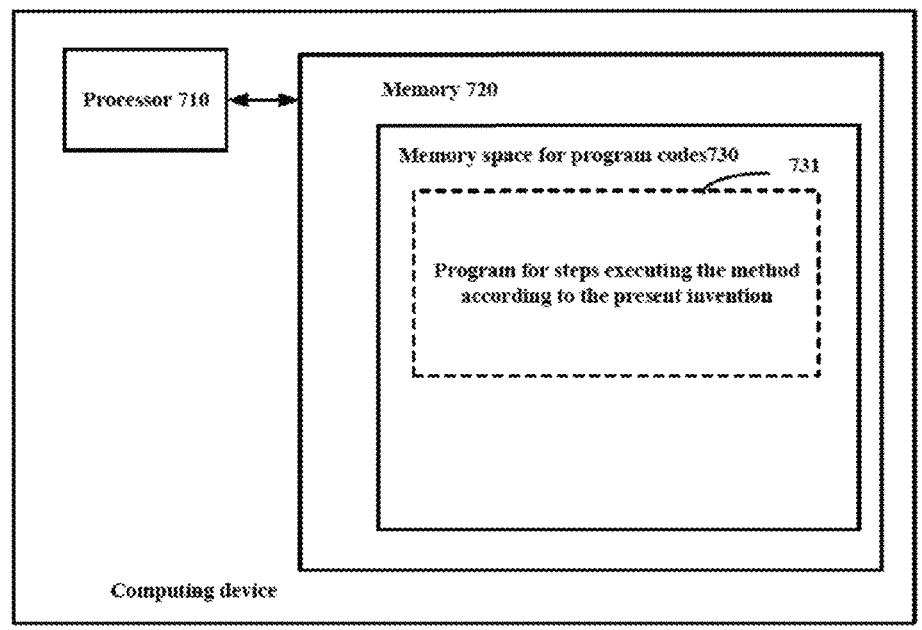
FIG. 7 schematically shows a block diagram of a computer device used to execute a method for processing a failure, which utilizes the DNS security system, according to the present invention.
Figure 8:
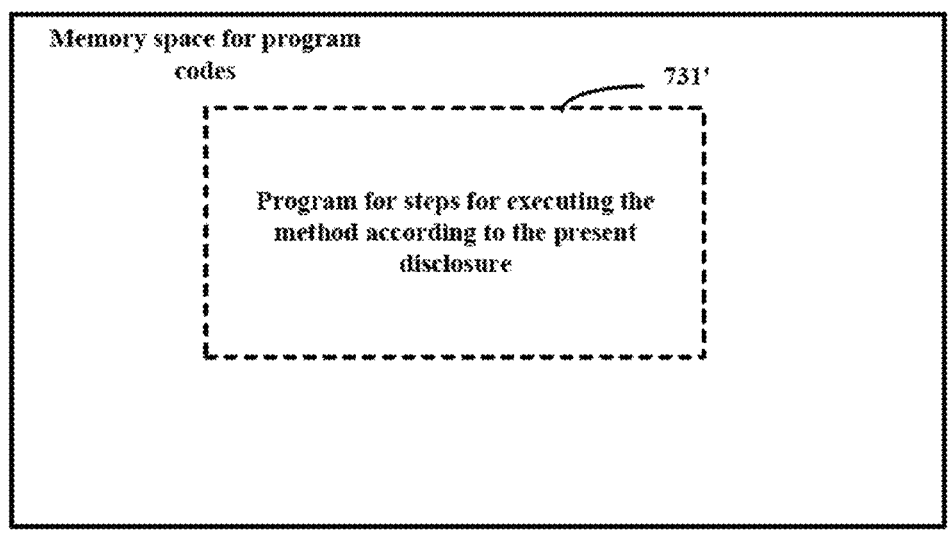
FIG. 8 schematically shows a memory cell used to save or carry program code for realizing a failure processing method, which utilizes the DNS security system, according to the present invention.

For example, FIG. 7 is a block diagram of a computing device for executing the failure processing method using the DNS security system according to the present invention. Traditionally, the computing device includes a processor 710 and a computer program product or a computer readable medium in form of a memory 720. The memory 720 could be electronic memories such as flash memory, EEPROM (Electrically Erasable Programmable Read-Only Memory), EPROM, hard disk or ROM. The memory 720 has a memory space 730 for program codes 731 executing any steps in the above methods. For example, the memory space 730 for program codes may include respective program codes 731 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in FIG. 8. The memory cells may be provided with memory sections, memory spaces, etc., similar to the memory 720 of the computing device as shown in FIG. 7. The program codes may be compressed, for example, in an appropriate form. Usually, the memory cell includes computer readable codes 731' which may be read, for example, by processors 710. When these codes are operated on the computing device, the computing device may execute respective steps in the method as described above.

The "an embodiment", "embodiments" or "one or more embodiments" mentioned in the disclosure means that the specific features, structures or performances described in combination with the embodiment(s) would be included in at least one embodiment of the present invention. Moreover, it should be noted that, the wording "in an embodiment" herein may not necessarily refer to the same embodiment.

Many details are discussed in the specification provided herein. However, it should be understood that the embodiments of the disclosure may be implemented without these specific details. In some examples, the well-known methods, structures and technologies are not shown in detail so as to avoid an unclear understanding of the description.

It should be noted that the above-described embodiments are intended to illustrate but not to limit the present invention, and alternative embodiments may be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings may be interpreted as a name.

Also, it should be noticed that the language used in the present specification is chosen for the purpose of readability and teaching, rather than explaining or defining the subject matter of the present invention. Therefore, it is obvious for an ordinary skilled person in the art that modifications and variations could be made without departing from the scope and spirit of the claims as appended. For the scope of the present invention, the publication of the inventive disclosure is illustrative rather than restrictive, and the scope of the present invention is defined by the appended claims.

What is claimed is:

1. A computing device, comprising:
    a memory having instructions stored thereon;
    a processor configured to execute the instructions to perform operations for domain name system (DNS) security, the operations comprising:
    initiating a DNS request;
    providing authorization information for the DNS request;
    storing all DNS requests and corresponding authorization information in a designated area and generating an authorization information database;
    determining whether a DNS resolution failure occurs in a root node, wherein the determining whether a DNS resolution failure occurs in a root node further comprises performing a monitoring on a DNS datagram at an outlet of a critical region of the designated area at a backbone network;
    initiating a virtue root node and using the virtual root node to invoke corresponding authorization information from the authorization information database when the DNS resolution failure occurs on the root node; and
    providing a resolution service to a corresponding client.

2. The computing device according to claim 1, wherein the authorization information comprises DNS resolution record with a stored access amount exceeds a visit threshold, and/or a DNS resolution record of an important domain name.

3. The computing device according to claim 1, wherein storing all DNS requests and corresponding authorization information in a designated area comprises the operation of forming a domain name level space according to the corresponding relation of the authorization information.

4. The computing device according to claim 3, wherein the authorization information database is a mirror of the internet domain name level.

5. The computing device according to claim 1, wherein invoking corresponding authorization information from the authorization information database when a DNS resolution failure occurs on the root node comprises the operation of using a distributed deployment to provide DNS resolution service for the client via a boundary gateway protocol (BGP) way.

6. The computing device according to claim 5, wherein the BGP way comprises an anycast mode.

7. The computing device according to claim 1, wherein the operations further comprises:
    modifying the root node address stored in the local to the address pointing to the virtual root node when the DNS resolution failure occurs in the root node; or, sending the local domain name resolution to the virtual root node.

8. A failure processing method, comprising:
    obtaining and storing all domain name system (DNS) requests and corresponding authorization information in a designated area, and generating an authorization information database;
    determining whether a DNS resolution failure occurs in a root node, wherein the determining whether a DNS resolution failure occurs in a root node further comprises performing a monitoring on a DNS datagram at an outlet of a critical region of the designated area at a backbone network;
    initiating a virtual root node and using the virtual root node to invoke corresponding authorization information stored in the authorization information database in response to a determination that the DNS resolution failure occurs in the root node; and
    providing a DNS resolution service for a corresponding client.

9. The method according to claim 8, wherein the authorization information comprises DNS resolution record with a stored access amount exceeds a visit threshold, and/or a DNS resolution record of an important domain name.

10. The method according to claim 8, wherein the authorization information database is further configured to form a domain name level space according to the corresponding relation of the authorization information.

11. The method according to claim 10, wherein the authorization information database is a mirror of the internet domain name level.

12. The method according to claim 8, wherein the virtual root node is further configured to: use a distributed deployment to provide DNS resolution service for the client via a boundary gateway protocol (BGP) way.

13. The method according to claim 12, wherein the BGP way comprises an anycast mode.

14. The method according to claim 8, further comprising:
at least one recursion DNS modifying the root node address stored in the local to the address pointing to the virtual root node when the DNS resolution failure occurs in the root node; or, sending the local domain name resolution to the virtual root node.

15. A non-transitory computer-readable medium having computer programs stored thereon that, when executed by one or more processors of an electronic device, cause the electronic device to perform a failure processing method, the failure processing method comprising:
obtaining and storing all domain name system (DNS) requests and corresponding authorization information in a designated area, and generating an authorization information database;
determining whether a DNS resolution failure occurs in a root node, wherein the determining whether a DNS resolution failure occurs in a root node further comprises performing a monitoring on a DNS datagram at an outlet of a critical region of the designated area at a backbone network;
initiating a virtual root node and using the virtual root node to invoke corresponding authorization information stored in the authorization information database in response to a determination that the DNS resolution failure occurs in the root node; and
providing a DNS resolution service for a corresponding client.

16. The non-transitory computer-readable medium according to claim 15, wherein the authorization information comprises DNS resolution record with a stored access amount exceeds a visit threshold, and/or a DNS resolution record of an important domain name.

17. The non-transitory computer-readable medium according to claim 15, wherein the authorization information database is further configured to form a domain name level space according to the corresponding relation of the authorization information.

18. The non-transitory computer-readable medium according to claim 15, wherein the virtual root node is further configured to: use a distributed deployment to provide DNS resolution service for the client via a boundary gateway protocol (BGP) way.

* * * * *